(12) United States Patent
Huang et al.

(10) Patent No.: US 9,680,904 B2
(45) Date of Patent: Jun. 13, 2017

(54) ADAPTIVE BUFFERS FOR MEDIA PLAYERS

(71) Applicant: Verizon Patent and Licensing Inc., Basking Ridge, NJ (US)

(72) Inventors: Jian Huang, Sudbury, MA (US); Jianxiu Hao, Lexington, MA (US); Gaurav D. Mehta, Brookline, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 355 days.

(21) Appl. No.: 14/041,897

(22) Filed: Sep. 30, 2013

(65) Prior Publication Data

US 2015/0095509 A1    Apr. 2, 2015

(51) Int. Cl.
*G06F 15/16*    (2006.01)
*H04L 29/06*    (2006.01)

(52) U.S. Cl.
CPC ............ *H04L 65/80* (2013.01); *H04L 65/604* (2013.01)

(58) Field of Classification Search
CPC ...................................... H04L 12/65
USPC ....................................... 709/231
See application file for complete search history.

(56) References Cited

U.S. PATENT DOCUMENTS

| | | | | |
|---|---|---|---|---|
| 6,820,128 B1 * | 11/2004 | Firoiu | ..................... | H04L 47/10 709/232 |
| 2004/0190519 A1 * | 9/2004 | Dugatkin | ........... | H04B 17/0085 370/394 |
| 2005/0086386 A1 * | 4/2005 | Shen | .................... | H04L 67/2852 709/249 |
| 2006/0230176 A1 * | 10/2006 | Dacosta | ............ | H04L 29/06027 709/235 |
| 2007/0201500 A1 * | 8/2007 | Deshpande | ............. | H04L 47/10 370/412 |
| 2014/0267322 A1 * | 9/2014 | McVay | ..................... | G06T 1/60 345/520 |

* cited by examiner

*Primary Examiner* — Ario Etienne
*Assistant Examiner* — Sm Z Islam

(57) ABSTRACT

A system and method relate to determining am initial buffer size associated with a buffer and modifying the initial buffer size when jitter is detected. The initial buffer size may be determined and modified based on a maximum initial buffer size, and the maximum initial buffer size may be determined based on delays associated with storing data to the buffer. For example, the maximum initial buffer size may correspond to a quantity of data that can be stored to the buffer during a maximum acceptable buffering delay. The maximum acceptable buffering delay may be identified by determining drop rates associated with different buffering delays and selecting, as the maximum acceptable buffering delay, one of the buffering delays associated with a maximum acceptable drop rate.

20 Claims, 8 Drawing Sheets

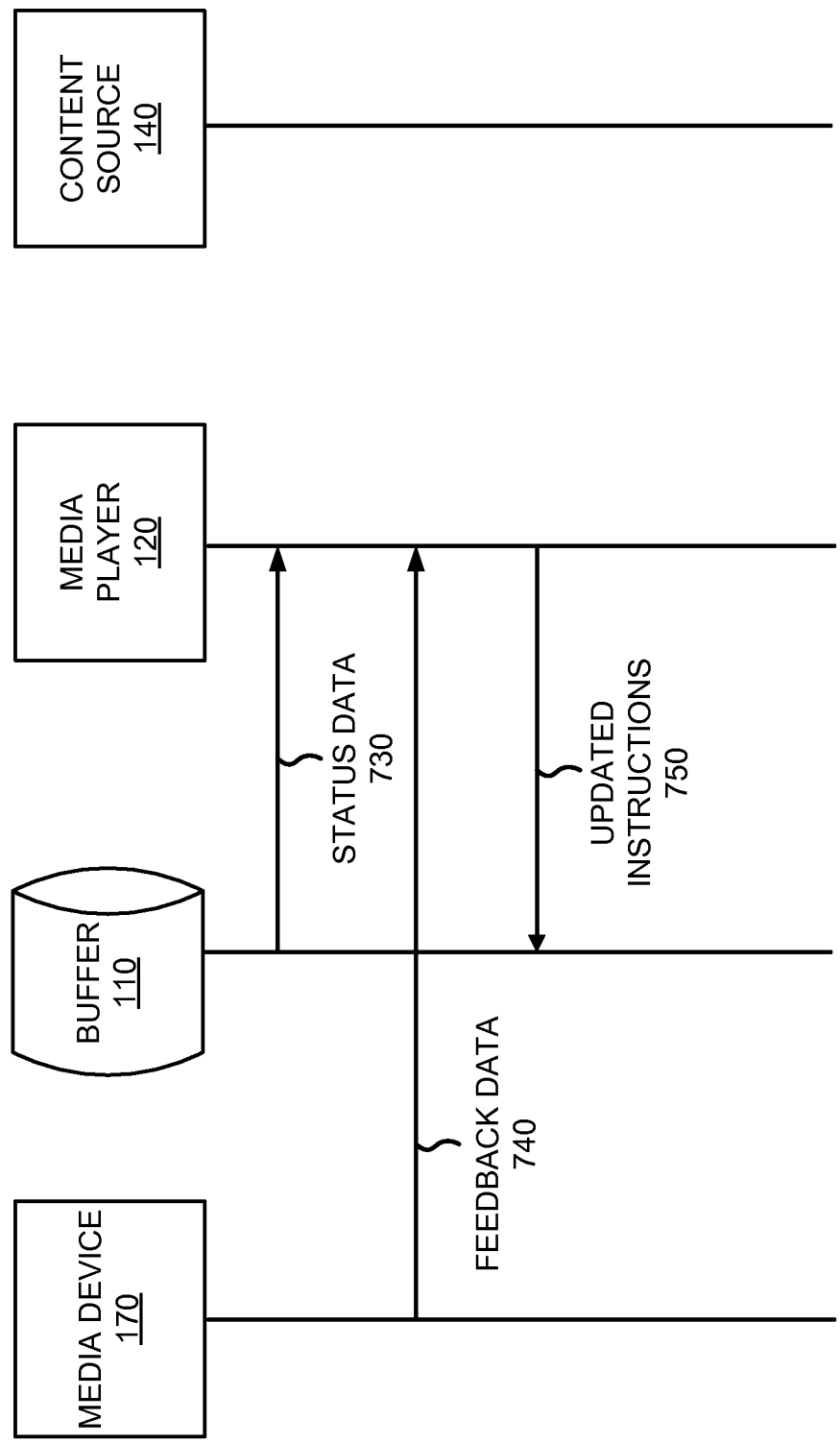

ADAPTIVE BUFFERS FOR MEDIA PLAYERS

BACKGROUND

A media player may receive a multimedia stream and use data in the multimedia stream to reproduce audio and/or video content. Errors, such as latency, packet loss, and/or jitter, may occur while reproducing audio and/or video content, and the errors may undesirably effect the reproduction of the audio and/or video event. For example, jitter may cause a portion of the multimedia content to be presented too early, too late, or out of order with respect to another portion of the multimedia content. To reduce jitter and other timing errors, a portion of the media stream may be buffered or stored before the media players starts to provide the reproduced audio and/or video content.

BRIEF DESCRIPTION OF THE DRAWINGS

FIGS. 7A and 7B depict exemplary communications between components of the system of FIG. 1.

DETAILED DESCRIPTION OF PREFERRED EMBODIMENTS

The following detailed description refers to the accompanying drawings. The same reference numbers in different drawings identify the same or similar elements.

An implementation described herein may relate to automatically adjusting an initial buffer used by a media player to buffer data, such as multimedia content being streamed from a remote source, before presenting the data to a user. As used herein, the term "initial buffer size" may refer the size of a portion of a buffer used by a media player to store the content before the media player starts to play the content. An acceptable delay associated with buffering may be determined, and the initial buffer size may be determined based on the acceptable delay. The initial buffer size may be resized to reduce or eliminate jitter during the playback of media content.

Figure 1:
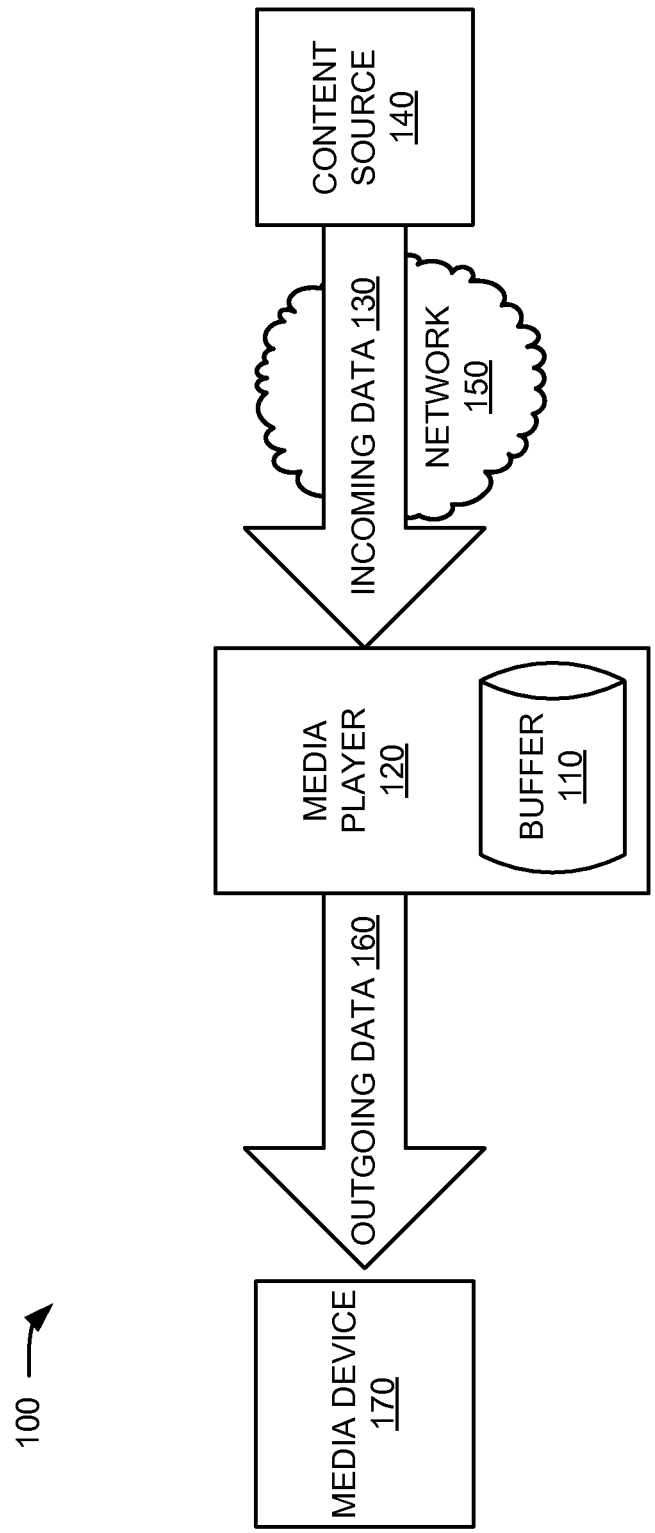
FIG. 1 depicts an exemplary system related to providing an adaptive buffer for a media player.

FIG. 1 depicts an exemplary system 100 for providing an adaptive buffer in accordance with an implementation provided herein. As illustrated in FIG. 1, system 100 may include buffer 110 associated with media player 120. Media player 120 may receive incoming data 130 from content source 140 via network 150, and media player 120 may store at least a portion of the received data in buffer 110. Media player 120 may process and/or decode the data stored in buffer 110 and may provide outgoing data 160 to media device 170.

Buffer 110 may include a storage device or memory to store content. Buffer 110 may include, for example, a random access memory (RAM), cache, or another type of dynamic storage device, a content addressable memory (CAM), a magnetic and/or optical recording memory device and a corresponding drive (e.g., a hard disk drive, optical drive, etc.), and/or a removable form of memory, such as a flash memory. Although buffer 110 is depicted in FIG. 1 as being included in media player 120, it should be appreciated that buffer 110 may be a separate device. For example, buffer 110 and media player 120 may be separated by network 150.

Buffer 110 may be associated with a physical limit, such as the maximum amount of memory that can be allocated from buffer 110 to store incoming data. In operation, media player 120 may determine a portion (also referred to as an "initial buffer size") of buffer 110 and cache/store the initial buffer size before playing the content. The initial buffer size cannot exceed than the physical limit of buffer 110, and may be adjusted by media player 120 to maximize performance (e.g., decrease jitter) while minimizing delays (e.g., a delay before playing content) that are associated with storing incoming data 130 to buffer 110.

Media player 120 may include, for example, any device capable of communicating with content source 140 using, for example, a client application, a browser application (e.g., Internet Explorer®, Mozilla Firefox®, Google Chrome®, Apple Safari®, Opera®, etc.), etc., to receive incoming data 130 and to deliver outgoing data 160 to media device 170. For example, media player 120 may be a client device that establishes a session with content source 140 to acquire incoming data 130. Examples of media player 120 may include a client device, such as digital television receiver, a set-top box, a digital video recorder (DVR), a desktop computer; a laptop computer; a tablet computer; a mobile communication device, such as a mobile phone, a smart phone, a tablet computer, a laptop, a personal digital assistant (PDA), or another type of portable communication device; and/or another type of computation and/or communication device that may receive and present (e.g., to a user) digital content option.

In one implementation, media player 120 may include a client application that enables media player 120, for example, to receive information from content source 140 and/or to present information media device to user. In some implementations, the client application (or instructions to retrieve the client application) may be included in, for example, portable media (e.g., a Blu-ray disc, a flash drive, etc.) that a user may provide to media player 120.

In one implementation, media player 120 may request, from content source 140 (e.g., via network 150), a list of available content. Media player 120 may include an interactive client interface that allows a user to select (e.g., via a remote control or other input device) incoming content 130 from the list of available content.

Media player 120 may store, or cache, incoming data 130 into buffer 110 before initiating delivery of content to media device 170. However, a significant delay may occur if media player 120 waits until buffer 110 is full before media player 120 initiates the delivery. Accordingly, media player 120 may fill only a portion of buffer 110, or an initial buffer size, before transmitting data 160 to media device 170.

The initial buffer size, or the portion of buffer 110 used by media player 120 for caching/storing content, may correspond to a fraction of the capacity of buffer 110. Media player 120 may determine the initial buffer size based on various factors, such as an incoming data rate (e.g., bit rate), a desired maximum delay or delay period associated with media player 120 storing data to buffer 110, a bit rate associated with outgoing data 160, and/or other performance criteria, such as jitter.

Incoming data 130 may include, for example, multimedia content (e.g., audio, video, text, document, images, etc.). Incoming data 130 may be delivered to media player 120 from content source 140 using file transport protocol (FTP) and/or a streaming transport protocol, such as Microsoft® Media Server (MMS), real-time transport protocol (RTP), real-time streaming protocol (RTSP), hypertext transfer protocol (HTTP) live streaming (HLS), Smooth Streaming, HTTP dynamic streaming (HDS), and/or Moving Picture Experts Group MPEG dynamic adaptive streaming over HTTP (MPEG-DASH). Incoming data 130 may include, for example, an audio stream compressed using an audio codec such as MPEG Audio layer III (MP3), Vorbis or Advanced Audio Coding (AAC), a video stream compressed using a video codec such as H.264, advanced video coding (AVC), or VP8, and/or an encoded audio and video streams assembled in a container bit stream such as MPEG-4, Flash® video (FLV), WebM, Advanced Systems Format (ASF) or Internet Streaming Media Alliance (ISMA).

Content source 140 may include one or more server devices or a storage device, such as a database device for providing data 130 to media player 120. Content source 140 may perform encoding operations on video content using, for example, public/private keys. Content source 140 may also perform transcoding operations on data 130 prior to transmission. Content source 140 may store video content in encrypted and/or encoded form.

In one implementation, access to content source 140 (e.g., by media player 120) may be restricted by a service provider that operates content source 140. For example, access to content source 140 may be restricted to a media player 120 associated with particular subscription packages, via, for example, passwords (for a user), device identifiers (for media player 120), and/or application identifiers (e.g., residing on media player 120).

Content source 140 may manage delivery of video content to media player 120. For example, content source 140 may permit media player 120 to download, as data 130, particular multimedia content once media player 120 and/or an associated user have been properly authenticated.

Network 150 may include one or more wired and/or wireless networks. For example, network 150 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 150 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks. Although shown as a single element in FIG. 1, network 150 may include a number of separate networks that provide data/services to media player 120.

Outgoing data 160 may include, for example, data that has been processed, decoded, decrypted, etc. to be provided to media device 170. In some implementations, outgoing data 160 may include instructions as well as data, to enable media device 170 to reproduce images and/or sound associated with incoming data 130.

Media player 120 may provide outgoing data 160 to media device 170 at a particular bit rate. For example, media player 120 may provide high definition (HD) content to media device 170 at a bit rate of at least 2.5 megabits (Mbits) per second. It should be appreciated, however, that outgoing data 160 may be provided by media player 120 at various bit rates based on, for example, the performance/size of buffer 110, the bandwidth of incoming data 130, and/or the capabilities of media device 170.

Media device 170 may present information, images, and/or audio to a user(s) based on data 160. For example, device 200 may include a display, such as a liquid-crystal display (LCD), for displaying an image or series of images (i.e., a video) to the user and/or an audio device, such as speakers, for presenting audio content to the user.

Although FIG. 1 depicts exemplary components of system 100, in other implementations, system 100 may include fewer components, different components, differently arranged components, or additional components than depicted in FIG. 1. Additionally or alternatively, one or more components of system 100 may perform functions described as being performed by one or more other components of system 100. For example, media player 120 and media device 170 may be included in a single device, such as a computer, a handheld device, or a tablet. Also, while FIG. 1 depicts a single buffer 110, a single media player 120, a single content source 140, and a single media device 170 for illustrative purposes, and in practice, system 100 may include multiple buffers 110, media players 120, content sources 140, and/or media devices 170. For example, a single media player 120 may acquire streams of incoming data 130 from multiple content sources 140 and may provide the streams to multiple media devices 170.

Figure 2:
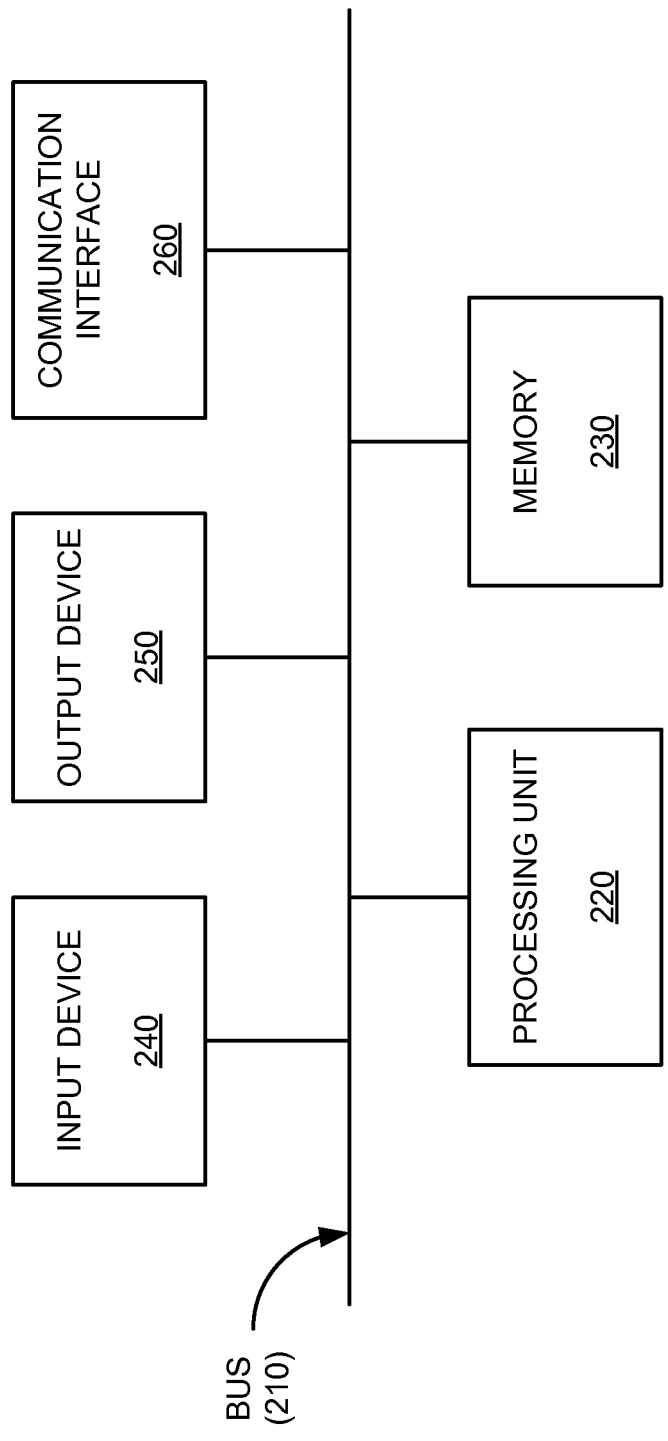
FIG. 2 depicts components of an exemplary device included in the system of FIG. 1.

FIG. 2 is a diagram illustrating exemplary components of device 200 according to an implementation described herein. Device 200 may correspond, for example, one or more components of buffer 110, media player 120, content source 140, and/or media device 170. As illustrated in FIG. 2, device 200 may include, for example, a bus 210, a processing unit 220, a memory 230, an input device 240, an output device 250, and a communication interface 260.

Bus 210 may include a path that permits communication among the components of device 200. Processing unit 220 may include any type of single-core processor, multi-core processor, microprocessor, latch-based processor, and/or processing logic (or families of processors, microprocessors, and/or processing logics) that interprets and executes instructions. In other embodiments, processing unit 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processing unit 220, and/or any type of non-volatile storage device that may store information for use by processing unit 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. For example, device 200 may not include a keyboard.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processing unit 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, two components may perform one or more tasks described as being performed by a component of device 200 or a component may perform one or more tasks described as being performed by two or more components of device 200.

Figure 3:
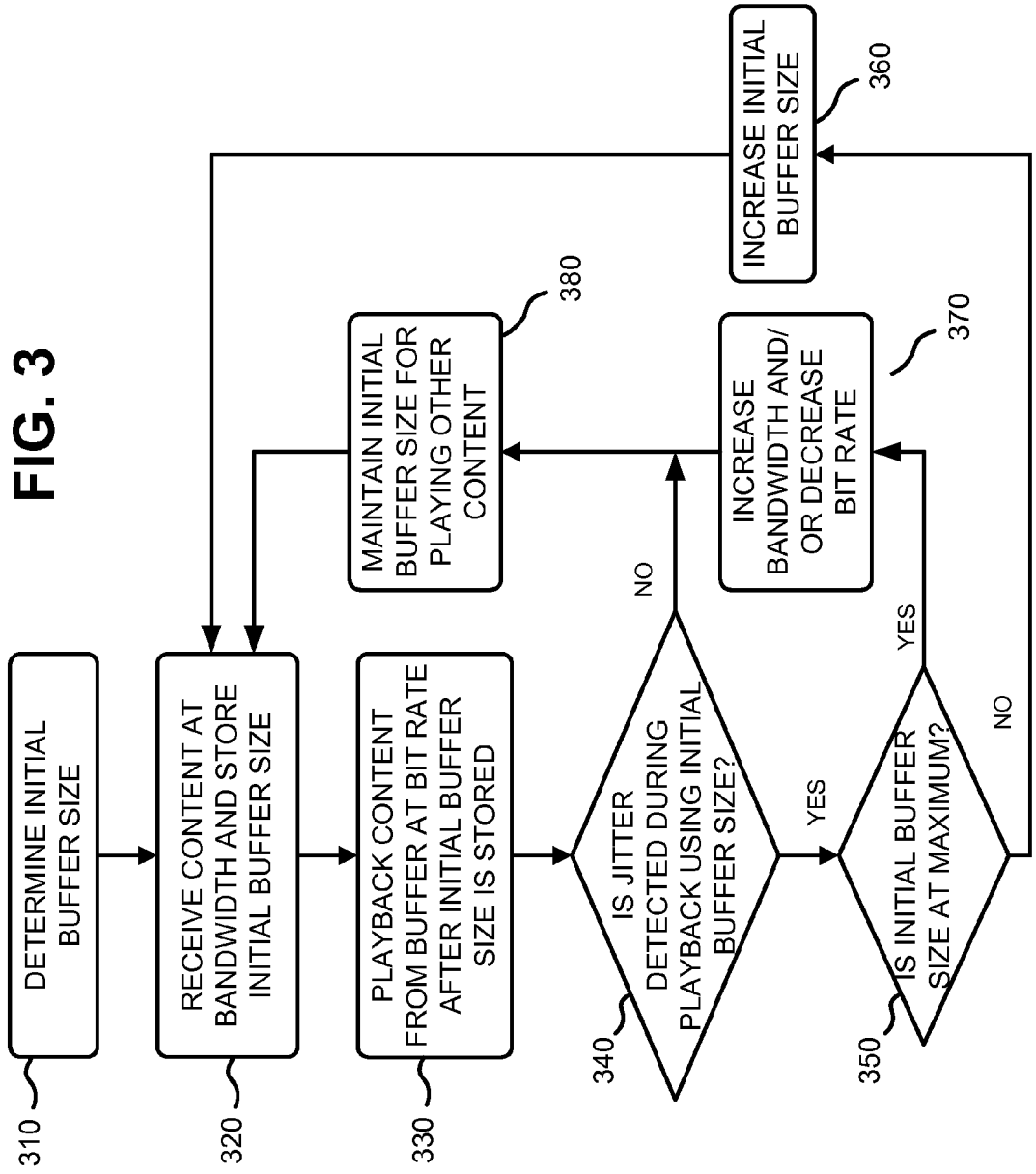
FIG. 3 depicts a flow diagram of an exemplary process for providing an adaptive initial buffer size for a media player.

FIG. 3 provides a flow diagram of an exemplary process 300 for providing an adaptive initial size for buffer 110. In one implementation, process 300 may be performed by media player 120. In other implementations, some or all of process 300 may be performed by another device or a group of devices separate from media player 120 and/or including media player 120.

Process 300 may include determining a beginning initial buffer size for buffer 110 that is used by media player 120 to store incoming data 130 (block 310). Media player 120 may determine the beginning initial buffer size in block 310, for example, when media player 120 and/or buffer 110 is initialized and/or in response to receiving a first request for content stored at content source 140. Additionally, media player 120 may determine the beginning initial buffer size in block 310 on a periodic basis (e.g., the beginning of each day) and/or after media player 120 has not played content for at least a threshold amount of time (e.g., media player 120 has not been used in during the last hour).

Media player 120 may determine the beginning initial buffer size in block 310 based on a storage capacity of buffer 110. The beginning initial buffer size may be sufficiently small in order to minimize buffering delays associated with caching incoming data 130. For example, the initial buffer size may be set as a portion (e.g., a twentieth) of the total storage capacity of buffer 110 or to a particular amount (e.g., 2 Mbits) that is less than the total storage capacity of buffer 110. By setting the initial buffer size to be less than the maximum buffer size, media player 120 may adjust the buffer size during the playback of outgoing content 160. For example, if jitter is detected, the buffer size may be increased from the initial buffer size.

The beginning initial buffer size may also be set based on a desired buffering delays associated with storing incoming data 130. For example, a buffering delay associated with storing incoming data 130 to buffer 110 may be determined based on expression (1):

$$\text{Delay} = \frac{\text{Buffer Size}}{BW}. \tag{1}$$

In expression (1), BW may correspond to the bandwidth of a channel for receiving incoming data 130. For example, BW may correspond to a bandwidth associated with a pathway in network 150 for sending data from content source 140 to media player 120. Media player 120 may determine BW based on, for example, monitoring traffic received from content source 140 over a time period. Media player 120 may also determine BW based on monitoring traffic over multiple time periods. For example, BW may correspond to an average bandwidth over network 150 during the multiple time periods. Media player 120 may further use statistical techniques to evaluate trends in changes in bandwidth of a path over network 150. For example, media player 120 may use Markov chain analysis or other statistical techniques to estimate the bandwidth over network 150 based on prior transmissions over network 150.

In a hypothetical situation in which the bandwidth for incoming data 130 over network 150 is 5 Mbits/sec and the beginning initial buffer size is 100 Mbits, media player 120 may delay, based on expression (1), initiating delivery of outgoing data 160 to media device 170 for 100÷5, or 20 seconds while storing the incoming data 130 to buffer 110. If the bandwidth for incoming data 130 over network 150 can be increased to 10 Mbits/sec (e.g., by negotiating a higher bandwidth path), the buffering delay may be reduced to 100÷10, or 10 seconds.

Expression (1) may be manipulated to determine the initial buffer size the following expression:

$$\text{Buffer Size} = \text{Delay} * BW \tag{2}.$$

The initial buffer size may be determined based on a desired delay and a bandwidth using expression (2). For example, if a desired buffering delay is 1.5 seconds and the bandwidth BW is 5Mbits, than the beginning initial buffer size may be set to 1.5×5, or 7.5 Mbits.

In another implementation, media player 120 may determine a total delay based on the buffering delay and additional factors that are not included in expression (2). For example, media player 120 may determine a delay further based on times for processing incoming data 130 and/or for writing data to buffer 110. Media player 120 may determine beginning initial buffer size in block 310 based on the additional factors using expression (2). Continuing with the above example in which a desired delay before playing content is 1.5 seconds and the bandwidth is 5Mbits, if media player 120 has a 0.5 second delay for processing and storing incoming data 130, than a buffering delay is 1 second, and the beginning initial buffer size may be set to 1×5, or 5 Mbits.

In another implementation, media player 120 may select the beginning initial buffer size from a range of possible buffer sizes. Media player 120 may select the beginning initial buffer size randomly or on a round-robin basis. For example, media player 120 may set the beginning initial buffer size by selecting a number between zero and a particular size (e.g., 10 Mbits) and/or by determining a fraction/portion (e.g., a twentieth) of the total storage capacity of buffer 110.

In another implementation, media player 120 may determine the beginning initial buffer size at least partially based on an input by a user of media player 120 and/or media device 170. For example, media player 120 may provide a graphical user interface (GUI) or another type of interface to receive an input from the user, and determine the initial buffer size at least partly based on the user input. For example, the user input may represent a lower bound and/or an upper bound for the beginning initial buffer size. Media player 120 may determine the beginning initial buffer size based on the user input and another factor, such as the total storage capacity of buffer 110.

Figure 4:
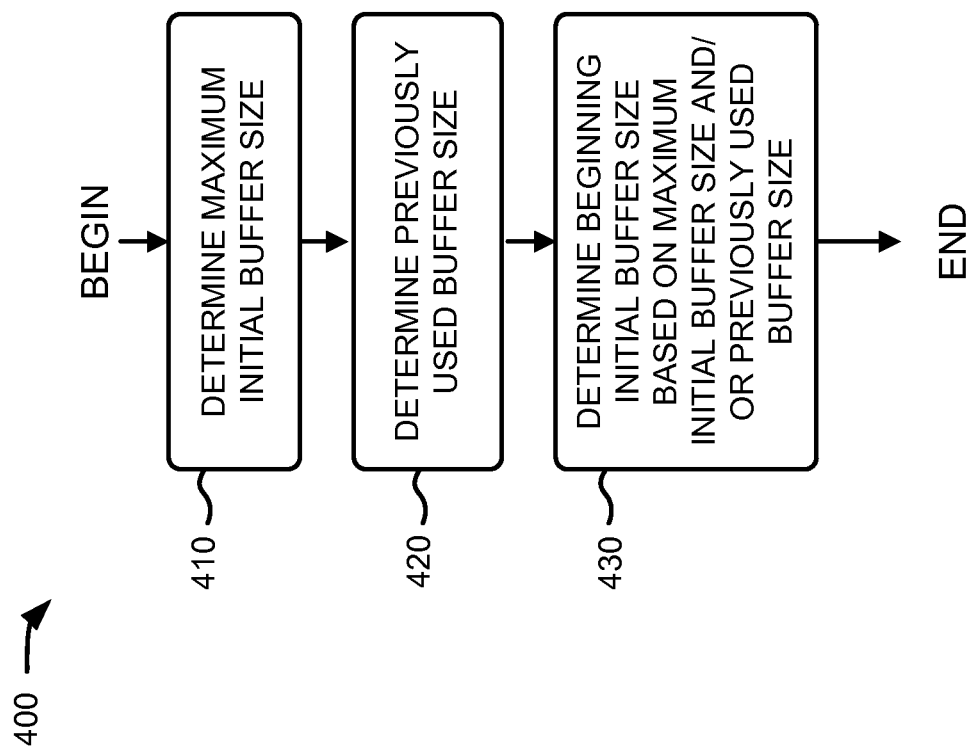
FIG. 4 depicts a flow diagram of an exemplary process for determining a beginning initial buffer size in the process of FIG. 3.

FIG. 4 is a flow diagram of exemplary process 400 for determining the beginning initial buffer size in block 310 according to another implementation. Process 400 may be performed by media player 120. In other implementations, some or all of process 400 may be performed by another device or a group of devices separate from media player 120 and/or including media player 120.

Process 400 may include determining a maximum initial buffer size associated with buffer 110 (block 410). In one implementation, the maximum initial buffer size determined in block 410 may correspond to or be determined based on an initial buffer size used by media player 120 during a prior transmission, such as a maximum buffer size used by media player 120 during the prior transmission.

Figure 5:
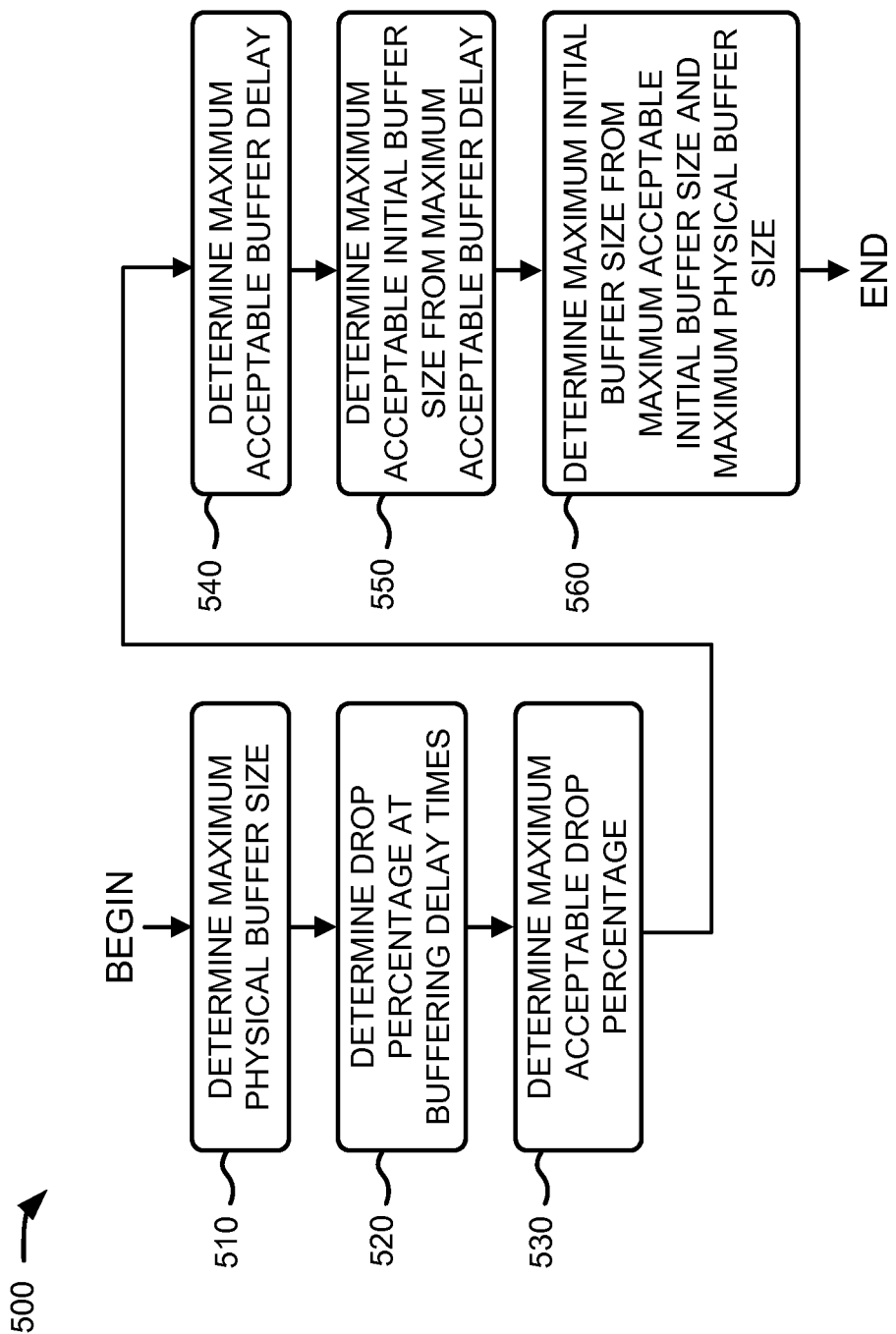
FIG. 5 depicts a flow diagram of an exemplary process for determining a maximum initial buffer size in the process of FIG. 3.

FIG. 5 is a flow diagram of exemplary process 500 for determining a maximum initial buffer size in block 410 according to one implementation. Process 500 may be performed by media player 120. In other implementations, some or all of process 500 may be performed by another device or a group of devices separate from media player 120 and/or including media player 120.

Process 500 may include determining a maximum physical buffer size associated with buffer 110 (block 510). For example, media player may access information associated with buffer and directly identify the maximum physical buffer size from this information. For example, if buffer 110 includes 100 memory units and each of the memory units stores 1 Mbits, then the maximum physical buffer size for buffer 110 may be 100×1, or 100 Mbits. Media player 120 may also dynamically determine the maximum physical buffer size for buffer 110. For example, data may be stored to buffer 110 until media player 120 detects an error message or other indication that the capacity of buffer 110 is reached.

Process 500 may include determining drop percentages at different buffering delays (block 520). As used herein, the term "drop percentage" or "drop rate" may include, for example, a percentage of or a rate at which users that stop viewing the content or drop the channel over which the content is transmitted from content source 140 to media player 120. Each drop rate may be associated with a particular delay. For example, a certain percentage of users may stop viewing outgoing data 160 via a media device 170 by selecting other content to view, deactivating media player 120, etc., at a particular delay.

Sample drop percentages for different delays are depicted in Table 1.

TABLE 1

| Buffering Delay (in seconds) | Drop Rate |
|---|---|
| 2 | 1% |
| 5 | 3% |
| 10 | 5% |
| 15 | 8% |
| 18 | 10% |

As can be seen in Table 1, the drop rates generally increase as the buffering delays increase. It should be appreciated that the delays and drops rates are presented in Table 1 are provided solely as examples.

The drop rates associated with the buffering delays may be determined in block 520 by evaluating user behavior. For example, user responses from multiple media players 120 and/or media devices 170 may be tracked to determine user responses (e.g., a number of drops) at different buffering delays. In one implementation, the drop percentages may be determined based on monitoring the behavior of a particular user associated with media device 170. For example, media player 120 may identify when the particular user drops, or stops viewing, the content of outgoing data 160 and may determine the buffering delay associated with the drops.

A maximum acceptable drop percentage may be determined (block 530). For example, the maximum acceptable drop percentage may be selected in block 530 based on instructions received by media player 120 from, for example, a user and/or an entity (e.g., a service provider) associated with network 150, and/or content source 140.

A maximum acceptable buffer time may be determined based on the maximum acceptable drop percentage (block 540). For example, a maximum acceptable buffer time that causes the maximum acceptable drop percentage may be identified. In Table 1, if a maximum drop rate is 8%, then the maximum acceptable buffer time would be 15 seconds.

In another implementation, media player 120 may determine the maximum acceptable buffer time (also referred to as "buffering delay") based on a user input. For example, media player 120 and/or media device 170 may include a GUI or other type of interface that receives an input from a user, and media player 120 may determine the maximum acceptable buffering delay based on the input. For example, the user may specify that the buffering delay should be less than 10 seconds.

Media player 120 may determine a maximum acceptable initial buffer size from the maximum acceptable buffer time (block 550). For example, a maximum acceptable initial buffer size may be determined based on the maximum acceptable buffer time and a bandwidth BW based on expression (2). In Table 1, if a maximum desired drop rate is 8%, then a maximum acceptable buffering delay is 15 seconds. Based on expression (2), if the incoming channel bandwidth BW is 5 Mbits/sec, the maximum acceptable buffer size for the maximum acceptable buffering delay is 15 seconds would be 5×15, or 75 Mbits.

Media player 120 may determine a maximum initial buffer size based on the maximum physical buffer size and/or the maximum acceptable initial buffer size (block 560). For example, the maximum initial buffer size may be selected to be the smaller of the maximum physical buffer size and the maximum acceptable buffer size. Alternatively or in addition, the maximum initial buffer size may be determined based on the maximum physical buffer size and/or the maximum acceptable buffer size. For example, the maximum initial buffer size may be a portion of the maximum physical buffer size and/or the maximum acceptable buffer size.

Although FIG. 5 provides an exemplary process 500 for determining a maximum initial buffer size for media player 120, in other implementations, process 500 may include additional, fewer, or different steps than those depicted in FIG. 5. For example, process 500 may include steps for receiving a user input and determining the maximum initial buffer size further based on the user input.

Continuing with FIG. 4, determining the initial buffer size in process 400 may include, determining a prior used buffer size associated with buffer 110 (block 420), and determining an initial buffer size based on at least one of the maximum size or the prior used buffer size (block 430).

In one implementation, the initial buffer size may correspond to an initial buffer size previously used by medial player 120 when playing multimedia content or may be determined based on a prior used buffer size. For example, the initial buffer size may be set to be a portion (e.g., a tenth) of the maximum prior used buffer size. The percentage of the prior used buffer size to use as the initial buffer size may be based on, for example, a user input from a user of media player 120 and/or media device 170. For example, media player 120 may provide a GUI to receive a user input, and the percentage may be determined based on the input. In another implementation, a percentage of the prior used buffer size to use as the initial buffer size may be based on performance criteria, such as to minimize jitter, etc.

In another implementation, the initial buffer size may be determined in block 430 based on the maximum initial buffer size determined in step 410. Media player 120 may use an initial buffer size that is a portion (i.e., less than all) of the maximum initial buffer size. For example, using an initial buffer size that is a portion of the maximum initial buffer size may result in a smaller initial buffering delay, and media player 120 may increase the buffer size if needed during the playback of the multimedia content. For example, the initial buffer size may be selected to be a portion (e.g., a tenth) of the maximum initial buffer size. The percentage of the maximum initial buffer size to use as the initial buffer size may be based on, for example, a user input from a user of media player 120 and/or media device 170. For example, media player 120 may provide a GUI to receive a user input, and the percentage may be determined based on the input.

In another implementation, the beginning initial buffer size may be determined in block 430 based on a combination of the prior used initial buffer size and the maximum buffer size. For example, the initial buffer size may also be based on weighted difference of the prior used buffer size and the maximum buffer size. The beginning initial buffer size may also be based on modifying one or more of the prior used initial buffer size and/or the maximum buffer size based on performance criteria, such as to minimize jitter, etc.

Although FIG. 4 provides exemplary process 400 for selecting a beginning initial buffer size, in other implementations, process 400 may include additional, fewer, or different steps than those depicted in FIG. 4. For example, process 400 may include determining a minimum initial buffer size associated with achieving a desired level of performance, such as achieving less than a threshold level of jitter, and determining the initial buffer size in block 430 further based on this minimum buffer size. For example, the initial buffer size may be set to be at least the minimum buffer size.

Continuing with process 300 in FIG. 3, media player 120 may receive and store the initial buffer size of content to buffer 110 (block 320). For example, media player 120 may establish a session with content source 140 via network 150 to receive incoming data 130 and may store at least a portion of incoming data 130 to buffer 110 until the initial buffer size is stored.

After the initial buffer size is stored in block 320, media player 120 may provide the outgoing data 160 to media device 170 at a particular bit rate (block 330). Media player 120 may select the bit rate associated with outgoing data based on, for example, a desired playback quality. Typically, a higher bit rate may be associated with better playback quality, but may require greater processing and storage resources by media player 120 and may result in more jitter at a given buffer size. For example, a higher bit rate may cause media player 120 to extract and process data from buffer 110 relatively faster than a slower bit rate.

Media player 120 may determine whether jitter or other type of playback error is present during the playback after using the initial buffer size (block 340). In one implementation, media player 120 may determine whether jitter or other type of playback error exceeds a threshold level (block 350). For example, media player 120 may determine whether a packet delay variation (PDV) or other measure of jitter (e.g., a number of packets that are presented out of order, an extent that the packets are presented out of order, etc.) associated with the playback of outgoing data 160 is more than a threshold number.

In another implementation, media player 120 may monitor the status of buffer 110 during block 350. For example, media player 120 may determine whether the initial buffer size was used or whether buffer 110 otherwise had compromised performance while media player 120 provided outgoing data 160. Media player 120 may use this information to determine whether jitter or another timing error is likely to occur during transfer of another portion of outgoing data 160, and may alter the initial buffer size or take other precautions even if jitter did not occur.

If jitter or another error is not detected and/or the amount of jitter or other error does not exceed the threshold (block 340—NO), media player 120 may continue to use a current initial buffer size (block 380). In another implementation (not depicted in FIG. 3), media player 120 may reduce the initial buffer size.

If jitter or another error is detected and/or the amount of jitter or other error exceeds the threshold (block 340—YES), media player 120 may determine whether a currently used initial buffer size is at a maximum buffer size 110 (block 350). The maximum buffer size for buffer 110 may correspond, for example, to a maximum physical buffer size identified in block 510 and/or a maximum acceptable initial buffer size identified in block 550. For example, media player 120 may determine whether that the initial buffer size is at a maximum value if increasing the initial buffer size would cause a buffering delay that exceeds a maximum buffering delay identified in block 540.

If the currently used buffer size is not at the maximum (block 350—NO), media player 120 may increase the initial buffer size (block 360). For example, the initial buffer size may be increased by a particular amount (e.g., by 2 Mbits), by a percentage of the current buffer size (e.g., increasing the initial buffer size by 10%), by an amount determined based on a used input (e.g., an amount identified via a GUI), by a random amount, etc. In another implementation, media player 120 may determine an amount to increase the initial buffer size based on an amount of jitter or other error associated with presenting the outgoing data by media device 170. For example, media player 120 may increase the initial buffer size by a particular amount (e.g., 5 Mbits) if the measured jitter is less than a particular value and may increase the initial buffer size by a larger amount (e.g., 10 Mbits) if the measured jitter is equal to or greater than the particular value.

Figure 6:
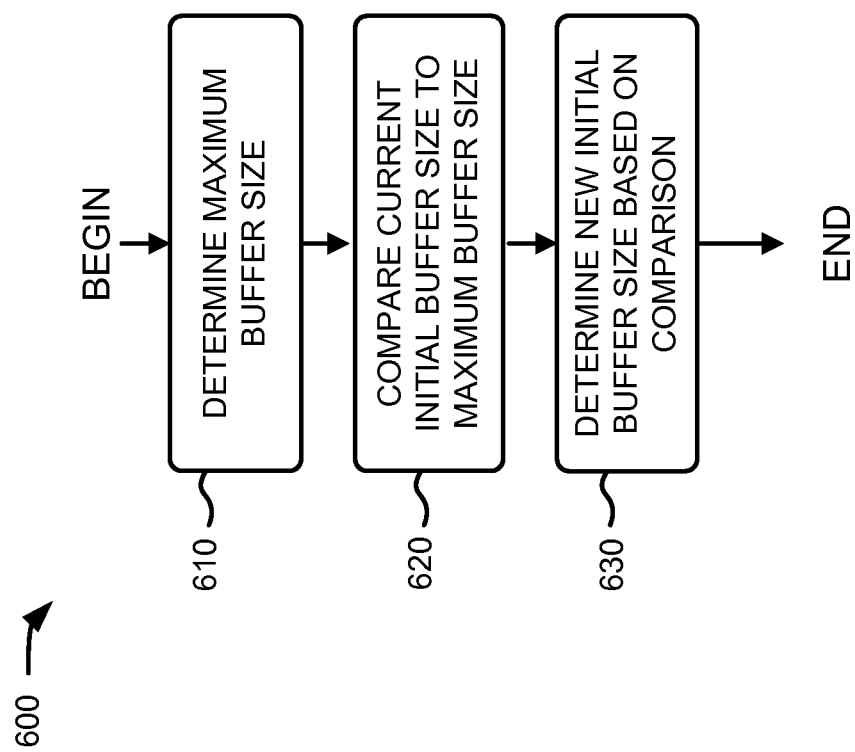
FIG. 6 depicts a flow diagram of an exemplary process for modifying a buffer in the process of FIG. 3.

FIG. 6 provides a flow diagram of exemplary process 600 for increasing the initial buffer size in block 360 according to one implementation. Process 600 may be performed, for example, by media player 120. In other implementations, some or all of process 600 may be performed by another device or a group of devices separate from media player 120 and/or including media player 120.

Process 600 may include determining a maximum initial buffer size (block 610). The maximum initial buffer size for buffer 110 may correspond, for example, to a maximum physical buffer size identified in block 510, the maximum acceptable initial buffer size identified in block 550, an initial buffer size specified by a user of media player 120, etc.

Media player 120 may compare the currently used initial buffer size to the maximum initial buffer size (block 620) and may determine a new buffer size based on the comparison (block 630). For example, a new buffer size may be determined based on the following expression:

$$\text{Buffer\_Size}_{new} = -\text{Buffer\_Size}_{OLD} + \frac{\text{Buffer\_Size}_{Max} - \text{Buffer\_Size}_{OLD}}{k} \quad (3)$$

In expression (3), $\text{Buffer\_Size}_{New}$ corresponds to the new initial buffer size to be used by media player 120 when playing other media content, $\text{Buffer\_Size}_{OLD}$ corresponds to the initial buffer size previously used by media player 120, $\text{Buffer\_Size}_{MAX}$ corresponds to the maximum initial buffer size usable by media player 120. Furthermore, k corresponds to a dampening factor (also referred to as "dampening value") that may slow increases in buffer initial size, provided that k is greater than 1. By way of example, if $\text{Buffer\_Size}_{OLD}$ is 10 Mbits, $\text{Buffer\_Size}_{MAX}$ is 100 Mbits, and dampening factor k equals 2, then the $\text{Buffer\_Size}_{NEW}$ would be 10+(100−10)/2, or 55 Mbits, based on expression (3). If the dampening factor k is increased to 5, $\text{Buffer\_Size}_{NEW}$ changes to 10+(100−10)/5, or 28 Mbits, based on expression (3). Thus, a larger dampening factor k will slow down the rate of increase in the initial buffer size relative to a smaller dampening value k. A small dampening value k may cause large jumps in the initial buffer size, whereas a large dampening value k may result in a new initial buffer size that is insufficient to prevent jitter or other playback errors during a next playback of multimedia content by media player 120. With a large dampening value k, achieving a sufficiently large initial buffer size to prevent jitter may require several increases while playing multiple multimedia contents.

Video player 120 may determine the dampening factor k based on a particular amount (e.g., k=2), based on a used input (e.g., an amount received via a GUI), based on a random value, etc. In another implementation, media player 120 may determine the dampening factor k based on an amount of jitter or other error associated with presenting outgoing data 160 by media device 170. For example, media player 120 may use a particular dampening value (e.g., 5) if the measured jitter is less than a particular level and may use another, smaller dampening value (e.g., 2) if the measured jitter is equal or greater than the particular level. In other words, the dampening value may vary so that the initial buffer size may increase at a faster rate when high levels of jitter are detected and the initial buffer size may increase at a slow rate when low levels of jitter are detected.

Returning to process 300 in FIG. 3, if media player 120 determines that a currently used buffer size is at (or exceeds) the maximum size (block 350—YES), the initial buffer size may not be further increased, and jitter or other transmission errors may be addressed through other techniques (block 370) while maintaining or continuing to use a previously used initial buffer size (block 380). For example, the bit rate for outgoing data 160 may be decreased to reduce the rate at which outgoing data is removed from buffer 110. Alternatively or additionally, a bandwidth for incoming data 130 may be increased, if possible. For example, media player may identify and use a higher bandwidth path through network 150 to receive incoming data 130. In another implementation, a compression and/or encoding algorithm associated with storing incoming data 130 to buffer 110 may be modified to increase the maximum amount of data that can be stored in buffer 110.

Although FIG. 3 provides an exemplary process 300 for dynamically determining and/or modifying a buffer size used by media player 120, in other implementations, process 300 may include additional, fewer, or different steps than those depicted in FIG. 3. For example, process 300 may include steps monitoring user behaviors associated with media device 170, and media player 120 may determine the dampening factor k based on monitoring the user behaviors. For example, if a user tends to drop (i.e., stops viewing/hearing) outgoing content 130 if the initial buffer size is changed too suddenly (such that a buffer delay differs significantly from a previous buffer delay experienced by the user), a larger dampening factor may be used to reduce or slow increases to buffer size.

Figure 7A:
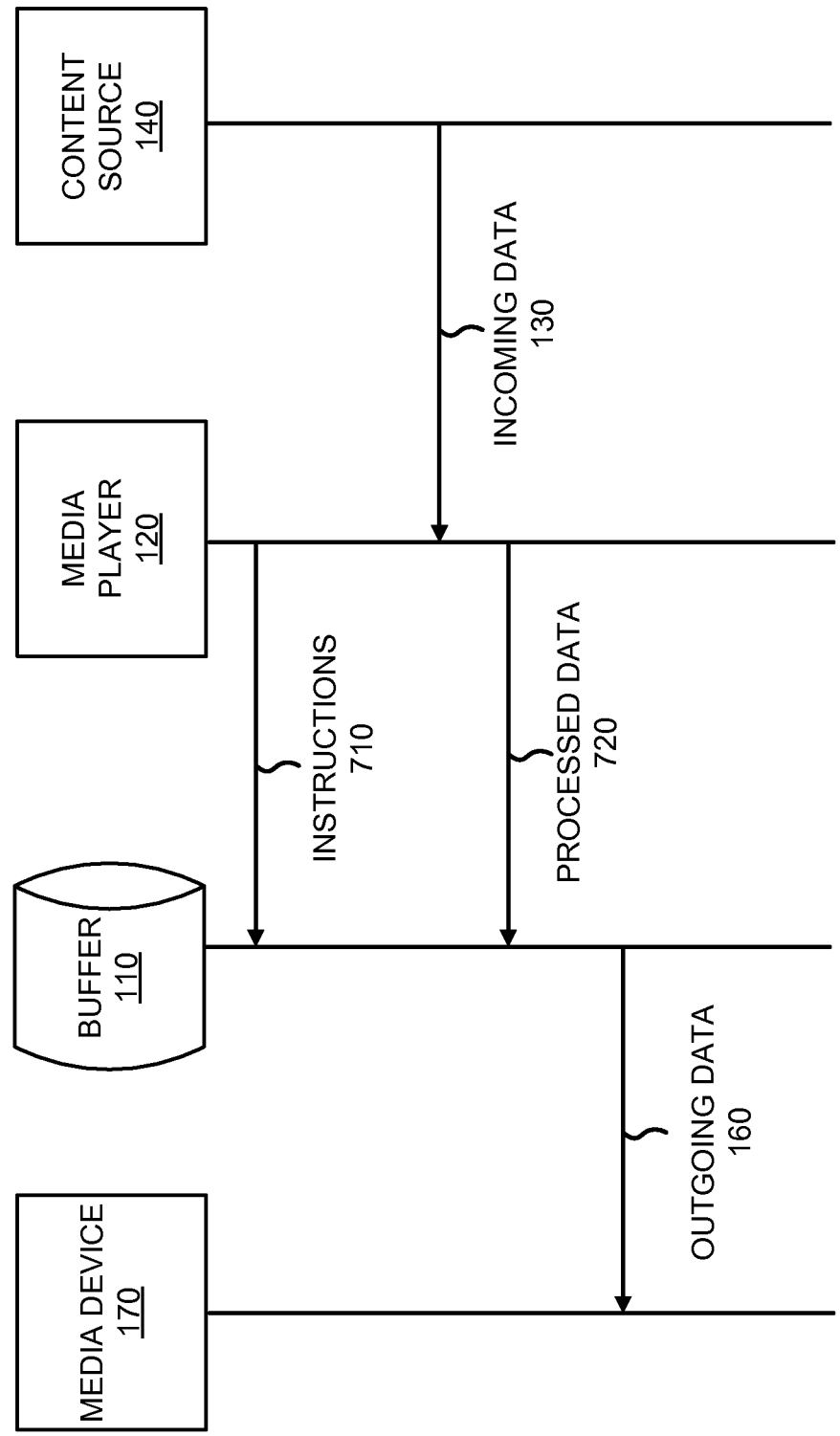

FIGS. 7A and 7B depict exemplary communications between components of system 100 in FIG. 1. As depicted in FIG. 7A, media player 120 may forward instructions 710 to buffer 110 identifying an initial buffer size that is determined using, for example, processes 300 and 400. Media player 120 may further receive incoming data 130 from content source 140 and process the incoming data 130 to form processed data 720. The processed data 720 may be stored to buffer 110 based on, for example, instructions 710. Outgoing data 160 may be provided to media device 170 from buffer 110 after the initial buffer size of processed data 720 is stored to buffer 110.

As depicted in FIG. 7B, media player 120 may receive status data 730 from buffer 110 and/or feedback data 740 from media device 170. Status data 730 may indicate, for example, a portion of buffer 110 that was used when providing outgoing data 160 to media device 170. Feedback data 740 may include information associated with playing outgoing data 160, such as an indication of any jitter. Media player 120 may determine a new buffer size using, for example, processes 300 and 600, and may forward updated instructions 750 identifying the new buffer size for use when providing other multimedia content.

Although FIGS. 7A and 7B provide depict exemplary communications between buffer 110, media player 120, content source 140, and/or media device 170, in other implementations, additional, fewer, or different communications may occur than those depicted in FIGS. 7A and 7B. For example, content source 140 forward data to media player 120 that provides an indication of a bandwidth BW associated with a channel for transmitting incoming content 130.

By way of example, consider a situation in which a maximum buffer size is 15 Mbits, the bandwidth BW varies during different time periods, and the streaming bit rate is 2 Mbit/sec. The following table 2 demonstrates results of using an initial buffer size of 3 Mbits.

TABLE 2

| Time (Second) | Data Received During Time Period | Streaming bit rate | Data stored in Buffer after Time Period | Status of Media Player |
|---|---|---|---|---|
| 1 | 3 Mbits | 0 | 3 Mbits | Buffering |
| 2 | 2 Mbits | 2 Mbits | 3 Mbits | Playing |
| 3 | 1 Mbits | 2 Mbits | 2 Mbits | Playing |
| 4 | 1 Mbits | 0 | 1 Mbits | Buffering |
| 5 | 2 Mbits | 0 | 3 Mbits | Buffering |
| 6 | 2 Mbits | 2 Mbits | 3 Mbits | Playing |
| 7 | 1 Mbits | 2 Mbits | 2 Mbits | Playing |
| 8 | 1 Mbits | 0 | 1 Mbits | Buffering |
| 9 | 1 Mbits | 0 | 2 Mbits | Buffering |
| 10 | 2 Mbits | 0 | 4 Mbits | Buffering |
| 11 | 8 Mbits | 2 Mbits | 10 Mbits | Playing |

In the example of Table 2, media player 120 is only buffering without playing content at 1, 4, 5, 8, 9, and 10 seconds, and media player 120 is playing content at 2, 3, 6, 7, and 11 seconds. In this example, media player 120 may play at more times if, for example, the streaming bit rate is reduced.

As depicted in Table 3, the stability of the media player 120 may be improved in this example if the initial buffer size is increased from 3 Mbit to 5 Mbits.

TABLE 3

| Time (Second) | Data Received During Time Period | Streaming bit rate | Data stored in Buffer after Time Period | Status of Media Player |
|---|---|---|---|---|
| 1 | 3 Mbits | 0 | 3 Mbits | Buffering |
| 2 | 2 Mbits | 2 Mbits | 3 Mbits | Playing |
| 3 | 1 Mbits | 2 Mbits | 2 Mbits | Playing |
| 4 | 1 Mbits | 0 | 1 Mbits | Buffering |
| 5 | 2 Mbits | 0 | 3 Mbits | Buffering |
| 6 | 2 Mbits | 0 | 5 Mbits | Buffering |
| 7 | 1 Mbits | 2 Mbits | 4 Mbits | Playing |
| 8 | 1 Mbits | 2 Mbits | 3 Mbits | Playing |
| 9 | 1 Mbits | 2 Mbits | 2 Mbits | Playing |
| 10 | 2 Mbits | 2 Mbits | 2 Mbits | Playing |
| 11 | 8 Mbits | 2 Mbits | 8 Mbits | Playing |

In the example of Table 3, the initial buffer size is increased at 5 Mbits, causing media player 120 to only buffer content during seconds 1, 4, 5, and 6, but playing content during the other time periods. In comparison to the example provided in Table 2, media player 120 in the example of Table 3 plays content with fewer interruptions (i.e., time periods in which media player 120 is buffering without presenting data).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 3-6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   determining, by a processor, a first initial buffer size associated with a buffer;
   storing, by the processor, first data to the buffer based on the first initial buffer size;
   providing, by the processor and to a viewer, a portion of the first data stored in the buffer;
   detecting, by the processor, jitter associated with providing the portion of the first data stored in the buffer to the viewer;
   determining a desired buffering delay associated with storing content to the buffer, wherein determining the desired buffering delay includes:
      identifying viewer drop rates associated with different buffering delays, wherein the viewer drop rates identify likelihoods that the viewer will cease viewing content when the content is presented with the different buffering delays;
      selecting a desired viewer drop rate from the viewer drop rates; and
      identifying, as the desired buffering delay, one of the different buffering delays associated with the desired viewer drop rate;
   determining a maximum initial buffer size based on the desired buffering delay, wherein the maximum initial buffer size corresponds to a quantity of data that can be stored to the buffer during the desired buffering delay;
   determining, by the processor, whether the first initial buffer size is less than the maximum initial buffer size associated with the buffer;
   increasing, by the processor, the first initial buffer size to form a second initial buffer size based on determining that the first initial buffer size is less than the maximum initial buffer size and based on detecting the jitter; and
   storing, by the processor and based on increasing the first initial buffer size, second data to the buffer based on the second initial buffer size.

2. The method of claim 1, wherein the buffer receives the first data at a bandwidth and provides the portion of the first data at a bit rate, and
   wherein the method further comprises:
      causing, when the first initial buffer size corresponds to the maximum initial buffer size, at least one of:
         the bandwidth to be increased, or
         the bit rate to be decreased.

3. The method of claim 1, wherein the maximum initial buffer size further corresponds to a maximum amount of data that can be stored to the buffer.

4. The method of claim 1, wherein increasing the first initial buffer size includes:
   determining a difference between the first initial buffer size and the maximum initial buffer size; and
   increasing the first initial buffer size based on the difference between the first initial buffer size and the maximum initial buffer size.

5. The method of claim 1, wherein increasing the first initial buffer size further includes:
   determining a dampening factor; and
   increasing the first initial buffer size further based on the dampening factor.

6. A device comprising:
   a memory configured to store instructions; and
   a processor configured to execute one or more of the instructions to:
      determine a first initial buffer size and a maximum initial buffer size associated with a buffer, wherein first data is stored to the buffer based on the first initial buffer size, wherein the processor, when determining the maximum initial buffer size, is further configured to:
         identify viewer drop rates associated with different buffering delays, wherein the viewer drop rates identify likelihoods that a viewer will cease viewing content when the content is presented with the different buffering delays,
         select a desired viewer drop rate from the viewer drop rates,
         identify, as a desired buffering delay, one of the different buffering delays associated with the desired viewer drop rate, and
         determine the maximum initial buffer size based on the desired buffering delay, wherein the maximum initial buffer size corresponds to a quantity of data that can be stored to the buffer during the desired buffering delay,
      determine whether jitter occurs while the first data is provided from the buffer based on the first initial buffer size,
      determine, when the jitter occurs while the first data is provided from the buffer based on the first initial buffer size, a difference between the first initial buffer size and the maximum initial buffer size, and
      determine a second initial buffer size based on the difference between the first initial buffer size and the maximum initial buffer size, wherein second data is stored to the buffer based on the second initial buffer size.

7. The device of claim 6, wherein the maximum initial buffer size further corresponds to a maximum amount of data that can be stored to the buffer.

8. The device of claim 6, wherein the processor, when determining the maximum initial buffer size based on the desired buffering delay, is further configured to execute one or more of the instructions to:
   determine a bandwidth of a communication link over which the first data is received by the buffer, and
   determine the quantity of data stored to the buffer during the desired buffering delay based on the bandwidth.

9. The device of claim 6, wherein the processor, when determining the second initial buffer size, is further configured to execute one or more of the instructions to:
   determine, as the second initial buffer size, the first initial buffer size increased by the difference between the first initial buffer size and the maximum initial buffer size.

10. The device of claim 6, wherein the processor, when determining the second initial buffer size, is further configured to execute one or more of the instructions to:
    determine a dampening factor, and
    determine the second buffer size further based on the dampening factor.

11. The device of claim 10, wherein the processor, when determining the dampening factor, is further configured to execute one or more of the instructions to:
    determine a quantity of the jitter that occurs while the first data is provided from the buffer based on the first initial buffer size, and
    determine the dampening factor based on the quantity of the jitter.

12. A non-transitory computer-readable medium configured to store instruction, the instructions comprising:
    one or more instructions that, when executed by a processor, cause the processor to:

identify viewer drop rates associated with different buffering delays wherein the viewer drop rates identify likelihoods that a viewer will cease viewing content when the content is presented with the different buffering delays;
select a desired viewer drop rate from the viewer drop rates;
select, as a desired buffering delay, one of the different buffering delays, wherein the one of the different buffer delays is associated with the desired viewer drop rate;
determine a maximum initial buffer size based on the desired buffering delay, wherein the maximum initial buffer size corresponds to a quantity of data stored to the buffer during the desired buffering delay;
determine a first initial buffer size based on the maximum initial buffer size, wherein first data is stored to the buffer based on the first initial buffer size;
determine an quantity of jitter that occurs when the first data is provided from the buffer; and
modify, when the quantity of the jitter exceeds a threshold, the first initial buffer size based on the maximum initial buffer size to form a second initial buffer size, wherein second data is stored to the buffer based on the second initial buffer size.

13. The non-transitory computer-readable medium of claim 12, wherein the one or more instructions further cause the processor to:
determine a bandwidth that of a communication link over which data is received by the buffer, and
determine the quantity of data stored to the buffer during the desired buffering delay based on bandwidth.

14. The non-transitory computer-readable medium of claim 12, wherein the one or more instructions, when causing the processor to modify the first initial buffer size based on the maximum initial buffer size to form the second initial buffer size, further cause the processor to:
increase the first initial buffer size based on a difference between the first initial buffer size and the maximum initial buffer size.

15. The non-transitory computer-readable medium of claim 12, wherein the one or more instructions, when determining the a first initial buffer size based on the maximum initial buffer size, further cause the processor to:
determine the first initial buffer size as a portion of the maximum initial buffer size.

16. The non-transitory computer-readable medium of claim 12, wherein the one or more instructions, when causing the processor to determine the maximum initial buffer size, further cause the processor to:
determine a maximum amount of data that can be stored to the buffer; and
determine the maximum initial buffer size as a portion of the maximum amount of data that can be stored to the buffer.

17. The method of claim 1, wherein identifying the viewer drop rates associated with the different buffering delays includes:
monitoring presentations of programming data to the viewer;
identifying, based on monitoring the presentation of the programming data to the viewer, one or more times when the viewer ceased viewing the programming data,
identifying delays associated with the one or more times; and
determining the viewer drop rates associated with the different buffering delays based on the delays associated with the one or more times.

18. The method of claim 5, wherein determining a dampening factor includes:
determining a quantity of the jitter associated with providing the portion of the first data stored in the buffer to the viewer;
selecting a first value for the dampening factor when the quantity of the jitter is less than a threshold; and
selecting a second value for the dampening factor when the quantity of the jitter is greater than or equal to the threshold, wherein the second value is less than the first value.

19. The device of claim 6, wherein the processor, when identifying the viewer drop rates associated with the different buffering delays, is further configured to execute one or more of the instructions to:
monitor presentations of programming data to the viewer,
identify, based on monitoring the presentation of the programming data to the viewer, one or more times when the viewer ceased viewing the programming data,
identify delays associated with the one or more times, and
determine the viewer drop rates associated with the different buffering delays based on the delays associated with the one or more times.

20. The device of claim 11, wherein the processor, when determine the dampening factor based on the quantity of the jitter, is further configured to execute one or more of the instructions to:
select a first value for the dampening factor when the quantity of the jitter is less than a threshold, and
select a second value for the dampening factor when the quantity of the jitter is greater than or equal to the threshold, wherein the second value is less than the first value.

* * * * *